United States Patent [19]
Nolan et al.

[11] Patent Number: 5,199,098
[45] Date of Patent: Mar. 30, 1993

[54] MOISTURE RESISTANT OPTICAL FIBER COATINGS WITH IMPROVED STABILITY

[75] Inventors: Kelly J. Nolan, Beaver Dams; Emily M. Squires, Painted Post, both of N.Y.; Eric H. Urruti, Wilmington, N.C.

[73] Assignee: Corning Incorporated, Corning, N.Y.

[21] Appl. No.: 773,525

[22] Filed: Oct. 9, 1991

[51] Int. Cl.$^5$ .............................................. G02B 6/10
[52] U.S. Cl. ..................................... 385/128; 385/145
[58] Field of Search ................ 385/128, 126, 127, 145

[56] References Cited

U.S. PATENT DOCUMENTS

| | | | |
|---|---|---|---|
| 4,472,019 | 9/1984 | Bishop et al. | 385/128 |
| 4,496,210 | 1/1985 | Ansel et al. | 385/128 |
| 4,609,718 | 9/1986 | Bishop et al. | 528/49 |
| 4,783,544 | 11/1988 | Yokoshima et al. | 558/267 |
| 4,843,111 | 6/1989 | Yokoshima et al. | 522/42 |

*Primary Examiner*—Frank Gonzalez
*Attorney, Agent, or Firm*—Kees van der Sterre

[57] ABSTRACT

Moisture-resistant UV-curable acrylate resin coated optical fibers are described, the coating compositions comprising a phosphite stabilizing agent in combination with an acrylate-terminated polyurethane oligomer wherein the urethane groups are the reaction product of an aliphatic isocyanate and a predominantly saturated, predominantly nonpolar aliphatic diol. The coating compositions offer improved curing speed while maintaining excellent thermal stability.

4 Claims, No Drawings

MOISTURE RESISTANT OPTICAL FIBER COATINGS WITH IMPROVED STABILITY

BACKGROUND OF THE INVENTION

The present invention relates to polymeric protective coatings for optical fibers, and more particularly to improved radiation-curable acrylate optical fiber coatings offering excellent moisture resistance and stability.

Glass optical fibers are a relatively recent innovation in the field of telecommunications. As is well known, protective coatings are customarily applied to these fibers at the time of manufacture, both to preserve the inherent strength of the fibers and to protect them from certain types of bending which can induce signal loss in telecommunication cables.

These requirements dictate that the coating applied to the optical fiber have both substantial toughness and yet be soft enough to distribute transverse strain applied to the fiber. An additional requirement for optical fiber coating materials derives from the fact that very high optical fiber drawing speeds are now being employed in the industry for reasons of manufacturing efficiency. For economic production, therefore, only coating materials which can be rapidly applied to and cured on the surface of the optical fiber are useful.

Currently, the preferred coating materials for rapid optic fiber production are radiation-curable coating formulations which can be very rapidly cured by UV irradiation. One family of particularly preferred coatings of this type comprises the radiation-curable polyurethane or polyurethane-polyurea acrylate materials. These are typically ultraviolet-curable formulations comprising acrylated polyurethane oligomers, available in liquid form, which can be cured to films which exhibit good softness over a very broad temperature range, good tensile strength and toughness, and rapid UV curing characteristics.

Specific examples of UV-curable acrylate compositions such as described are reported in published European patent applications EP 0204160 and EP 0204161. The compositions disclosed in these applications are based on resins more specifically designated acrylate-terminated polyurethane, polyurea, or polyurethane/polyurea oligomers.

It is of course important that the resin formulations selected for application to these optical fibers exhibit excellent resistance to moisture penetration and/or chemical breakdown over an extended period of time. Thus minimal interaction with water or water vapor and a polymer structure which resists chemical breakdown over a wide range of ambient conditions for the entire anticipated service life of the coated fiber are considered essential requisites of these coatings.

Existing urethane acrylate coating systems can be judged to exhibit excessively high water absorption for use in environments high in moisture content. Water absorption in these environments can be a critical problem since it can affect coating geometry and thereby cause increased fiber attenuation over time.

Notwithstanding the recognition of this problem, changes in acrylate coating composition to solve the problem have to date not been universally accepted in the industry. This is due in part to the fact that any changes in coating formulation which result in significant reductions in curing speed, or which degrade the chemical stability of the cured coating, are not commercially acceptable.

Cured coating stability is a factor of increasing importance in the formulation of new coating compositions. K. Ohashi et. al., in "Mechanisms of Hydrogen Evolution and Stabilization of UV-Cured Urethane Acrylate Resin for Coating of Optical Fiber", *Polymer Degradation and Stability*, 22 (1988) 223–232, review the problem of hydrogen evolution in cured coatings and some approaches to the solution of those problems. Y. Ohashi et. al., in *Chemical Abstracts*, 110 (4):25492q, disclose the utility of phosphite compounds for the suppression of hydrogen generation in polyether-based urethane acrylates, although a great many other formulation changes have of course also been proposed. Again, however, these proposed changes in composition for improved coating stability are rarely commercially successful, unless the "improved" composition also exhibits curing speed and moisture resistance which are at least equivalent to the coatings currently in commercial use.

It is therefore a principal object of the present invention to provide improved UV-curable acrylate coating formulations offering superior resistance to moisture attack, excellent curing speed, and excellent long-term chemical stability.

It is a further object of the invention to provide a coated optical fiber incorporating an improved urethane acrylate coating which offers better lifetime optical transmission characteristics in both moist and dry environments than prior art optical fibers.

Other objects and advantages of the invention will become apparent from the following description thereof.

SUMMARY OF THE INVENTION

The present invention achieves substantial improvements in moisture protection in an optical fiber protective coating without sacrificing the thermal stability of the coating system, and with curing speed equivalent to or better than existing coatings. These improvements are derived from a careful selection of coating system components for the purpose of reducing the content of polar species in the coating polymer, and increasing the saturation of carbon chain components therein. At the same time, compensation for the decreased thermal stability of the selected species is made through the addition of appropriate stabilizers to the formulations.

Coating compositions provided in accordance with the invention offer an excellent combination of flexibility and toughness such that they are ideally suited for service as a primary or first-layer protective coatings for optical fiber. However, modifications to the composition to provide increased hardness for use as a secondary or other coating layer on such fibers may readily be made. In either case, a substantial reduction in water absorption by the coating, when compared with conventional UV-curing urethane acrylate coatings is provided.

In a first aspect, then, the invention includes a fast-curing but stable, moisture-resistant UV-curable acrylate resin coating composition. The principal component of the composition is a moisture-resistant acrylate-terminated polyurethane oligomer. Of course, as in conventional UV-curable acrylate coating systems, other components such as acrylate monomers, reactive diluents, photoinitiators, and chemical stabilizers may also be present. However, in the present coatings these must be carefully selected to maintain compatibility with the selected oligomers, and to preserve the moisture resistant properties of the final composition.

Analogous to known coatings, the moisture-resistant polyurethane oligomers used in the coating compositions of the invention are acrylate-terminated polyurethanes; these result from the reaction of isocyanates and alcohols to form multiple urethane linkages following general synthesis procedures well known in the art.

In the formulations of the present invention, however, the urethane groups provided in the oligomers are characterized as reaction products of an aliphatic isocyanate and a predominantly saturated and predominantly nonpolar aliphatic diol. Hence, the presence in the oligomer of polar components, such as the polyester and polyether glycols conventionally present in prior art optical fiber coatings, is minimized or avoided.

The selection of moisture-resistant oligomers alone, however, does not provide an acceptable optical fiber coating. One difficulty is that such selection generally affects coating stability in an adverse manner, particularly with respect to the evolution of hydrogen from the coating which can be deleterious to fiber performance. This problem is solved in the coating compositions of the invention by additionally including in the composition at least one compatible chemical stabilizing agent which is effective to control harmful depolymerization or other interactions which might degrade fiber or coating performance over time. The effective stabilizers for this purpose have been found to be phosphite stabilizers or antioxidants. These markedly reduce hydrogen evolution from acrylate coating systems while at the same time being compatible with the moisture-resistant oligomers and acrylated monomers employed.

In a second aspect, the invention comprises a coated optical fiber exhibiting excellent resistance to optical degradation in a moist environment. The coated fiber comprises at least one conventional glass optical fiber of single-mode or multimode type, and further incorporates at least one moisture-resistant polymer coating provided from a coating composition such as above described. Most preferably, the polymer coating will comprise the primary or base coating on the fiber.

Coating compositions such as above described may be formulated to provide not only substantially reduced water absorption, but also curing speed superior to that of current commercial coatings, and with chemical stability which is at least equivalent thereto. Hence these coatings represent a significant advance in optical fiber coating technology which is particularly valuable in optical cabling applications such as submarine applications wherein high moisture resistance is a critical coating requirement.

DETAILED DESCRIPTION

As previously noted, the major component of the acrylate coating compositions of the invention, comprising 50% or more by weight of the composition, is a moisture-resistant acrylate-terminated polyurethane oligomer. The acrylate terminal groups in such oligomers may be provided by a monohydric polyacrylate capping component, or by a monoacrylate capping component such as 2-hydroxyethyl acrylate, in the known manner.

As previously noted, polyurethane oligomers are conventionally provided by reacting an aliphatic diisocyanate with a dihydric polyether or polyester, most typically a polyoxyalkalene glycol such as a polyethylene glycol. Such oligomers typically comprises 4–10 urethane groups and may be of high molecular weight, e.g., 2000–8000, although lower molecular weight oligomers, having molecular weights in the 500–2000 range, may also be used. Published European Patent Applications Nos. EP 0204160 and EP 0204161 describe such syntheses in detail and are expressly incorporated herein by reference for a further description of these known procedures.

The synthesis of the moisture-resistant oligomers used in the invention is analogous to the above-described synthesis except that the polar polyether or polyester glycols are avoided in favor of predominantly saturated and predominantly nonpolar aliphatic diols. These diols are preferably alkane or alkylene diols of from 2–250 carbon atoms; most preferably they are substantially free of ether or ester groups.

The ranges of oligomer viscosity and molecular weight obtainable in these systems are similar to the molecular weights obtainable in unsaturated, polar oligomer systems such as described in the aforementioned European patent applications, such that the viscosity and coating characteristics thereof can be kept substantially unchanged. And, advantageously and unexpectedly, the reduced oxygen content of these coatings has been found not to unacceptably degrade the adherence characteristics of the coatings to the surfaces of the optical fibers being coated.

While any of the isocyanates known for use in these polyurethane oligomer preparations could be used to develop acrylate oligomers from nonpolar aliphatic diols, the preferred isocyanates for this purpose are branched-chain, aliphatic diisocyanates. The most preferred isocyanates are branched-chain trifunctional diisocyanates comprising both isocyanate and additional functionality.

Examples of such trifunctional species include trifunctional diisocyanates produced by the condensation of two or more alkylene diisocyanate molecules to produce a longer-chain diisocyanate comprising one or more central allophanate functional groups. Advantageously, the use of these branched trifunctional diisocyanates increases the crosslink density of the polymerization products without seriously sacrificing the aliphatic nature of the polymer coatings.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

As previously indicated, the coating compositions of the invention will typically also comprise, in addition to the oligomer component, a lower molecular weight liquid acrylate-functional monomer component. This component is typically added to the formulation to provide the liquidity needed to apply the coating composition with liquid coating equipment. Typical acrylate-functional liquids in these systems have comprised monoacrylate monomers and linear aliphatic diacrylates. These have included diacrylates such as the polyalkylene (e.g., polypropylene or polyethylene) glycol diacrylates.

In the present formulations, the requirement to utilize moisture-resistant components places significant selection limitations on the acrylate-functional liquid monomers which may be employed to control the viscosity of the coating systems. Not all such liquids may be successfully blended and copolymerized with highly nonpolar oligomers. Further, many of the prior art monomers employed for this purpose, e.g., ethoxyethyl ethoxyethyl acrylate, phenoxyethyl acrylate, and butoxyethyl acrylate, comprise unwanted ether or ester groups.

For adequate coating compatibility and best moisture resistance, therefore, we prefer the use of a liquid acrylate monomer component comprising a predominantly saturated aliphatic mono- or di-acrylate monomer. Saturated acrylate monomers of from 6–18 carbon atoms are preferred, examples of such monomers including isodecyl acrylate, lauryl acrylate, octyl acrylate, and octadecyl acrylate. Particularly preferred are the branched monomers such as isodecyl acrylate. Small quantities of the alkoxy acrylate monomers used in prior art formulations may be included if desired, but these are not preferred.

As is well known, polyurethane acrylate coating formulations generally comprise conventional photoinitiators, such as the known ketonic photoinitiating additives, these being present in amounts sufficient to provide rapid ultraviolet curing. The present formulations will also comprise such photoinitiators, which may be selected and utilized in the same proportions as found effective for the polymerization of the known conventional acrylate coating compositions.

Finally, the coating formulations of the invention will additionally comprise selected stabilization agents, most preferably one or more phosphite stabilization agents, in order to control hydrogen evolution from the cured coatings. Somewhat surprisingly, notwithstanding the avoidance of polyester- and polyether-based oligomer constituents in our coatings, we have found that significant increases in $H_2$ evolution from the levels exhibited by present commercial coatings can be incurred unless provisions for adequate stabilization of the cured coating are made. Illustrative examples of specific phosphite stabilizers which may be used are diphenylisodecyl phosphite and tris-(2,4-di-tert-butyl phenyl) phosphite, although other phosphite stabilizers or antioxidants known to the art may alternatively be employed.

The invention may be further understood from the following Example illustrating the formulation and curing of an optical fiber coating in accordance therewith.

EXAMPLE

A batch for a UV-curing urethane acrylate coating composition is first prepared. To 70 parts by weight of a moisture-resistant polyurethane oligomer (the reaction product of a saturated nonpolar aliphatic diol and a trifunctional isocyanate comprising isocyanate and allophanate functional groups) are added 27 parts by weight of isodecyl acrylate monomer, 3 parts by weight of a 2,2-dimethoxy-2-phenyl acetophenone photoinitiator, and 0.5 parts by weight of tris-(2,4-di-tert-butyl phenyl) phosphite stabilizer. The oligomer is Uvithane ™ ZL-1365 oligomer from Morton Thiokol, Inc. of Moss Point, Miss., the monomer is Sartomer 395 acrylate commercially available from the Sartomer Company, Inc., West Chester, Pa., the photoinitiator is Irgacure 651 photoinitiator from Ciba Geigy of Hawthorne, New York, and the stabilizer is Naugard 524 stabilizer from the Uniroyal Chemical Company, Middlebury, Conn., USA.

The batch thus prepared is thoroughly blended by mechanical mixing at 55° C. to yield a coating formulation substantially equal in viscosity to a standard commercial coating. It is readily applied to optical fibers by standard liquid coating techniques, rapidly cures to a tough, resilient coating upon UV-irradiation at cure rates above those of a standard commercial coating, and exhibits much lower moisture absorption than the standard commercial coating. Also, the hydrogen evolution of the coating is at least as low as that of the standard coating.

A comparison of the curing and water absorption characteristics of the coating of the Example with the standard commercial coating is made by evaluating the cure rates and water absorption characteristics of acrylate films of the two coating compositions on flat support substrates. For the determinations of water absorption and water extraction, the coating formulations were applied to flat glass at equivalent thicknesses, and each coating was cured by the application 3.5 J/cm² of UV light energy. Relative cure rates were determined by the curing of coatings of equivalent thickness on flat substrates using a relatively low power UV light source, so that the level of curing over time could be accurately tracked. A comparison of the characteristics of the cured films thus determined is given in Table I below:

TABLE 1

| | Fiber Coating Tests | |
| --- | --- | --- |
| | Standard Coating | Example Coating |
| Cure Rate (seconds)* | 17 | 9 |
| Water Absorption (%) | 3.08 | 0.516 |
| Water Extraction (%) | 1.76 | 0.452 |

*seconds to achieve 95% of the E-modulus of the fully cured polymer coating

As is evident from a study of the data in Table 1, the acrylate films provided in accordance with the invention provide not only reduced water absorption (24-hour immersion at ambient temperature), but also reduced levels of water-extractable coating components as well as somewhat faster curing performance than the standard commercial coating.

When applied to optical fibers and overcoated with a higher-modulus outer buffer coatings, the acrylate coatings of the invention provided somewhat lower but still acceptable stripping force (264 grams v. 349 grams) than the standard commercial coating. And, although the susceptibility of the coated fibers to thermally induced optical absorption losses at low temperatures (down to −60° C.) were somewhat higher for the acrylate coatings of the Example, these were still well below the commercially acceptable level of 0.05 db/km.

The stability of the cured acrylate coatings against long-term hydrogen evolution is evaluated by heating coating samples to elevated temperatures to accelerate coating breakdown and hydrogen release, with analysis of the evolved gas composition being carried out by gas chromatograph after a fixed time interval. Under a standardized set of time/temperature conditions, hydrogen evolution from the standard commercial coating referenced above generally will not exceed about 0.14 μL of $H_2$ per gram of coating film.

As previously noted, hydrogen evolution from moisture-resistant coatings analogous to those of the invention, but not incorporating phosphite stabilizers, was unexpectedly found to be much higher than for the standard commercial coatings, with $H_2$ release values in excess of 8 $\mu$L/gram being recorded in some tests. However, with the addition of appropriate phosphite stabilizers, release values in the range below 0.5 $\mu$L/gram, and into the range of 0.11–0.13 $\mu$L/gram, are readily achievable. Other known stabilizers or antioxidants, including sulfur-containing (thiodipropionate) stabilizers and hindered amine or hindered phenolic antioxidants, were found to be relatively ineffective for this use.

While the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. A coated optical fiber exhibiting improved moisture resistance which includes a glass optical fiber disposed within a cured polymer coating, characterized in that the cured polymer coating comprises a phosphite stabilizing agent in combination with a cured polyurethane-acrylate polymer, the urethane groups in the cured polymer being the reaction product of an aliphatic isocyanate and a predominantly saturated, predominantly nonpolar aliphatic diol.

2. A coated optical fiber in accordance with claim 1 wherein the aliphatic isocyanate is a branched-chain diisocyanate.

3. A coated optical fiber in accordance with claim 1 wherein the aliphatic isocyanate is a branched-chain trifunctional isocyanate comprising both isocyanate and allophanate functionality.

4. A coated optical fiber in accordance with claim 3 wherein the predominantly saturated, predominantly nonpolar aliphatic diol is selected from the group consisting of alkane and alkylene diols of from 2–250 carbon atoms, said diols being substantially free of ether and ester groups.

* * * * *

REEXAMINATION CERTIFICATE (2487th)

United States Patent [19]

Nolan et al.

[11] B1 5,199,098

[45] Certificate Issued Feb. 14, 1995

[54] MOISTURE RESISTANT OPTICAL FIBER COATINGS WITH IMPROVED STABILITY

[75] Inventors: Kelly J. Nolan, Beaver Dams; Emily M. Squires, Painted Post, both of N.Y.; Eric H. Urruti, Wilmington, N.C.

[73] Assignee: Corning Ware Inc., Corning, N.Y.

Reexamination Request:
No. 90/003,196, Sep. 16, 1993

Reexamination Certificate for:
Patent No.: 5,199,098
Issued: Mar. 30, 1993
Appl. No.: 773,525
Filed: Oct. 9, 1991

[51] Int. Cl.⁶ .................................................. G02B 6/10
[52] U.S. Cl. ................................. 385/128; 385/145
[58] Field of Search ................ 385/126, 127, 128, 145

[56] References Cited

U.S. PATENT DOCUMENTS

4,120,721  10/1978  Ketley et al. .................... 96/36.3
5,146,531   9/1992  Shustack ......................... 385/128

OTHER PUBLICATIONS

Ohashi et al., Chemical Abstracts, 42–Coatings, vol. 110, (no month) 1989, "Hydrogen gas generation–suppressed UV–curable polymer compositions", p. 25,493.

Doyle, *The Development and Use of Polyurethane Products,* McGraw–Hill, 1971, pp. 13–15.

*Primary Examiner*—Rodney B. Bovernick

[57] ABSTRACT

Moisture-resistant UV-curable acrylate resin coated optical fibers are described, the coating compositions comprising a phosphite stabilizing agent in combination with an acrylate-terminated polyurethane oligomer wherein the urethane groups are the reaction product of an aliphatic isocyanate and a predominantly saturated, predominantly nonpolar aliphatic diol. The coating compositions offer improved curing speed while maintaining excellent thermal stability.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–4 dependent on an amended claim, is determined to be patentable.

1. A coating optical fiber exhibiting improved moisture resistance which includes a glass optical fiber disposed within a cured polymer *primary* coating, characterized in that the cured polymer *primary* coating comprises a phosphite stabilizing agent in combination with a cured polyurethane-acrylate polymer, the urethane groups in the cured polymer being the reaction product of an aliphatic isocyanate and a predominantly saturated, predominantly nonpolar aliphatic diol, *and characterized further in that the cured polymer primary coating is the reaction product of a coating composition which consists essentially of (i) a moisture-resistant oligomer formed from said aliphatic isocyanate and said aliphatic diol, (ii) a predominantly saturated alphatic mono- or di-acrylate monomer, (iii) a photoinitiator, and (iv) a phosphite stabilizing agents.*

* * * * *

REEXAMINATION CERTIFICATE (2860th)

United States Patent [19]

Nolan et al.

[11] B2 5,199,098

[45] Certificate Issued Apr. 30, 1996

[54] MOISTURE RESISTANT OPTICAL FIBER COATINGS WITH IMPROVED STABILITY

[75] Inventors: Kelly J. Nolan, Beaver Dams; Emily M. Squires, Painted Post, both of N.Y.; Eric H. Urruti, Wilmington, N.C.

[73] Assignee: Corning Incorporated, Corning, N.Y.

Reexamination Request:
No. 90/003,648, Nov. 30, 1994

Reexamination Certificate for:
Patent No.: 5,199,098
Issued: Mar. 30, 1993
Appl. No.: 773,525
Filed: Oct. 9, 1991

Reexamination Certificate B1 5,199,098 issued Feb. 14, 1995

[51] Int. Cl.⁶ ........................................... G02B 6/10
[52] U.S. Cl. ................................. 385/128; 385/145
[58] Field of Search ..................... 385/141, 142, 385/143, 144, 145, 127, 128

[56] References Cited

U.S. PATENT DOCUMENTS

| | | | |
|---|---|---|---|
| 4,120,721 | 10/1978 | Ketley et al. | 96/36.3 |
| 4,215,205 | 7/1980 | Landucci | 525/8.7 |
| 4,472,019 | 9/1984 | Bishop et al. | 350/96.3 |
| 4,487,876 | 12/1984 | Pokorny | 524/390 |
| 4,496,210 | 1/1985 | Ansel et al. | 350/96.3 |
| 4,609,718 | 9/1986 | Bishop et al. | 528/49 |
| 4,783,544 | 11/1988 | Yokoshima et al. | 558/267 |
| 4,843,111 | 6/1989 | Yokoshima et al. | 522/42 |
| 5,146,531 | 8/1992 | Shustack | 385/128 |

OTHER PUBLICATIONS

Doyle, *The Development and Use of Polyurethane Products,* McGraw–Hill, 1971, pp. 13–15 (no month).

Irganox 1035 and 1076 Commercial Brochures, Ciba–Geigy (no date).

Chemical Abstracts No. 110: 25492q (no month).

*Primary Examiner*—Brian M. Healy

[57] ABSTRACT

Moisture-resistant UV-curable acrylate resin coated optical fibers are described, the coating compositions comprising a phosphite stabilizing agent in combination with an acrylate-teminated polyurethane oligomer wherein the urethane groups are the reaction product of an aliphatic isocyanate and a predominantly saturated, predominantly nonpolar aliphatic diol. The coating compositions offer improved curing speed while maintaining excellent thermal stability.

B2 5,199,098

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 3 are cancelled.

Claims 1 and 4 are determined to be patentable as amended.

1. A [coating] *coated* optical fiber exhibiting improved moisture resistance which includes a glass optical fiber disposed within a cured polymer primary coating, characterized in that the cured polymer primary coating comprises a phosphite stabilizing agent in combination with a cured polyurethane-acrylate polymer, the urethane groups in the cured polymer being the reaction product of [an] *a branched chain trifunctional* aliphatic isocyanate *comprising both isocyanate and allophanate functionality* and a predominantly saturated predominantly nonpolar aliphatic diol, and characterized further in the cured polymer primary coating is the reaction product of a coating composition which consists essentially of (i) a moisture-resistant oligomer formed from said aliphatic isocyanate and said aliphatic diol, (ii) a predominantly saturated aliphatic mono- or di-acrylate monomer, (iii) a photoinitiator, and (iv) a phosphite stabilizing 171 agents] *agent*.

4. A coated optical fiber in accordance with claim [3] *1* wherein the predominantly saturated, predominantly nonpolar aliphatic diol is selected from the group consisting of alkane and alkylene diols of from 2–250 carbon atoms, said diols being substantially free of ether and ester groups.

\* \* \* \* \*